March 6, 1934.  S. G. KOTELEVTSEFF  1,949,723

AIR COMPRESSOR AND SUPERCHARGER

Filed March 7, 1933

SERGE G. KOTELEVTSEFF
INVENTOR

BY John P. Nixonow
ATTORNEY

Patented Mar. 6, 1934

1,949,723

UNITED STATES PATENT OFFICE 1,949,723

AIR COMPRESSOR AND SUPERCHARGER

Serge G. Kotelevtseff, New York, N. Y.

Application March 7, 1933, Serial No. 659,943

2 Claims. (Cl. 230—150)

My invention relates to air compressors and superchargers and has particular reference to the rotary type of compressors.

The object of my invention is to provide a compressor which can be operated at high speed without any objectionable noise and without any undue wear. Another object of my invention is to provide a compact and efficient compressor which can deliver air at high pressure suitable for various uses, for instance, as a supercharger for internal combustion engines, especially of the airplane type.

Still another object of my invention is to provide a compressor which can deliver a steady flow of compressed air, and in which the degree of compression can be regulated while the compressor is in operation.

In order to obtain practically noiseless operation of my compressor I provide rotary mutually interlocking members without any oscillating or reciprocating parts, such as valves etc. In order to obtain efficient operation and to prevent leakage of compressed air I provide interlocking portions of the rotary members with several points of contact.

In order to obtain greater compactness of the apparatus I provide the compressing rotary member with internal passages for the compressed air leading to the side ports, thereby increasing the active space in the housing for compressing air.

My invention is more fully explained in the accompanying specification and drawing in which—

Figure 1:
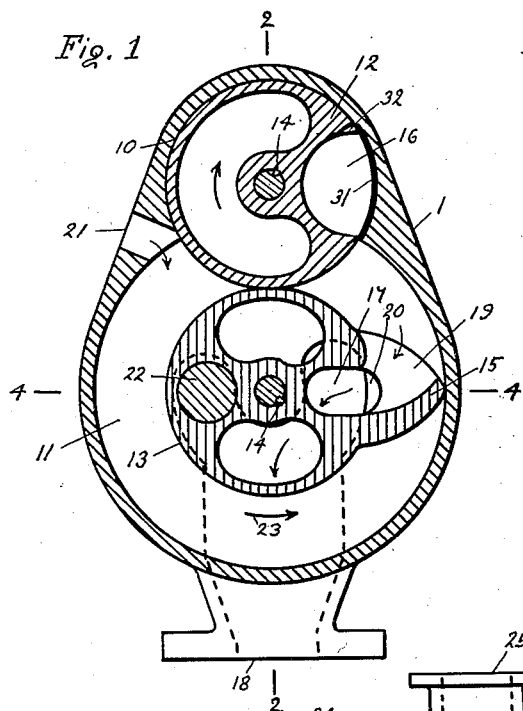
Figure 2:
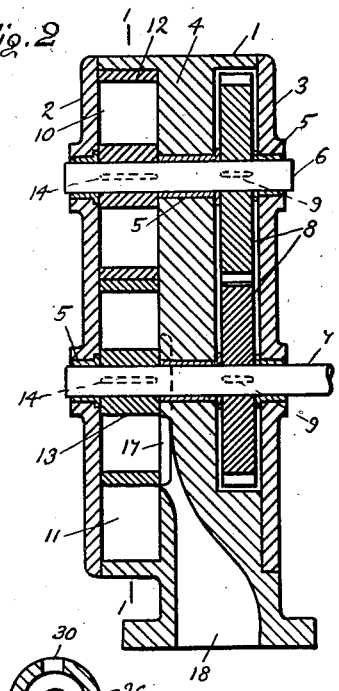
Figure 3:
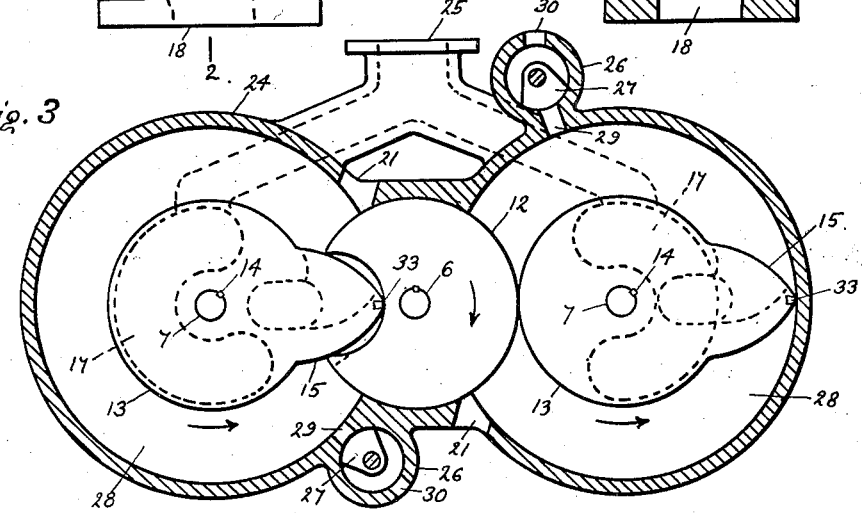
Figure 4:
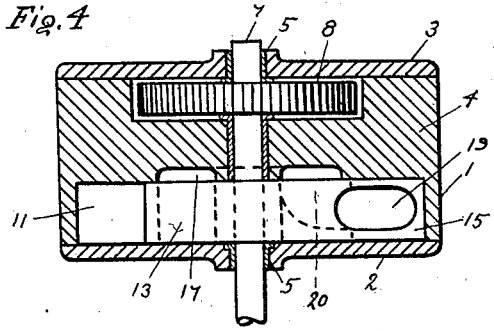

Fig. 1 is a sectional elevation of my compressor taken on the line 1—1 of Fig. 2, Fig. 2 is a sectional side view taken on the line 2—2 of Fig. 1, Fig. 3 is a sectional elevation of a modified device, and Fig. 4 is a transverse section taken on the line 4—4 of Fig. 1.

My compressor consists of a housing 1 with covers 2 and 3 and with a transverse partition 4. The partition (or wall) 4 and the covers are provided with bearings 5 for shafts 6 and 7. The latter shaft has an extension (shown broken off) for coupling it with a suitable source of power (not shown). Gears 8 of equal size and in mesh with each other are mounted on these shafts and held with keys 9. It is possible, however, to use gears of different size, for instance, by providing the rotor 12 with two recesses 16 and having the gear on the shaft 6 twice the size of the gear on the shaft 7. On the other side of the wall 4 the housing forms two overlapping circular chambers 10 and 11 for rotors 12 and 13 which are also mounted on the shafts 6 and 7 and held with keys 14. The rotors are of a cylindrical shape and fit snugly in the housing so as to prevent or to reduce the leakage of the compressed air. For the same purpose the rotors touch each other with their cylindrical surfaces providing a rolling contact. A certain slippage is not objectionable, however, so that the rotors may be made of different diameters, although the gears 8 must be of the same size in order to impart the same number of revolutions per minute to the shafts 6 and 7.

The guiding rotor 12 fits without any clearance in the circular (cylindrical) chamber 10, but the compressing rotor 13 is much smaller in diameter than the chamber 11, and it has a lug 15 which slides without any clearance over the inner surface of the chamber 11. The guiding or sealing rotor 12 has a recess 16 of such curvature that the tip of the lug 15 remains continuously in contact with the sides of the recess 16 while the lug passes in and out of the recess during the rotation of the rotors. The curvature of the recess is determined empirically, by plotting successive positions of the tip of the lug during its rotation in relation to the rotor 12.

In order to provide better sealing between the rotors, the lug 15 is shaped so as to have a constant three-point contact with the sides of the recess 16 as may be seen in Fig. 3. The shape of the lug 15 is also determined empirically by plotting successive relative positions of the rotors. The edges of the rotor 12 (horns) at the ends of the recess are slightly rounded off in order to provide larger wearing surfaces where they slide over the sides of the lug 15.

An arcuate groove 17 is provided in the side of the wall 4 of the chamber 11, concentric with the shaft 7 and in communication with an exhaust port 18. The lug 15 has an aperture 19 in its front side, extending in a substantially radial direction toward the center of the rotor and connected with a side opening 20 registering with the groove 17. The aperture 19 represents a channel diverging outward so as to facilitate the entrance of the air through this aperture. For the same purpose the walls in the aperture 19 are curved avoiding sharp changes in direction of the air flow. The lug 15, being convex on the outside, is concave inside forming a scoop for collecting the air and having a thin wall between the convex and concave surfaces with a thin outer edge at the tip of the lug so that practically the whole front surface of the lug represents an air collecting aperture. The rear wall of the lug 15 represents, therefore, a blade similar to a turbine blade, permitting the air to enter without a shock. The groove 17 does not extend completely around the chamber but ends as shown, extending somewhat farther at the exhaust side than at the intake, so as to prevent any direct communication between the intake and exhaust ports 21 and 18. This arrangement prevents any drop in pressure at the exhaust, as the port 18 becomes separated or disconnected from the chamber 11 as soon as the lug 15 begins to approach the position when the aperture 19 passes beyond the rotor 12 and opens into the chamber 11 at the intake port 21. The aperture 19 remains disconnected from the groove 17 until the lug 15 passes on the other side of the intake port 21, when compression begins. If it is desired to reduce still further possible surges in pressure, the intake side of the groove 17 may be shortened so that the opening 20 does not begin to register with the groove 17 until the air has been sufficiently compressed by the moving lug 15.

A plug of counterweight 22 is placed in the rotor 13 opposite the lug 19 in order to balance the rotor, for which purpose the plug may be made of some heavy alloy.

The operation of my compressor is as follows:

The shaft 7 is driven by a suitable source of power, for instance, by an electric motor, or by the shaft of an internal combustion engine if my compressor is used as a supercharger. The rotation must be in direction of an arrow 23 (Fig. 1). Outside air enters through the port 21 while the lug 15 approaches the rotor 12, being sucked in by the receding lug 15. The suction continues until the lug 15 enters the recess 16, when the suction almost ceases until the lug 15 slides over to the other side of the intake port 21. By this action the air drawn into the chamber 11 becomes separated from the rear side of the lug 15 and becomes closed between the side of the rotor 12 and the front side of the moving lug 15. With the further movement of the lug the metered portion of the air becomes compressed and forced out of the housing through the aperture 19, port 17 and the port 18. With every revolution of the rotor, therefore, a portion of the air becomes displaced from the intake to the exhaust side.

A modified arrangement is shown in Fig. 3 which represents a double acting compressor. The housing in this figure is shown in section and the cover removed, the rotors being shown from the outside. This compressor has two compressing rotors 13 located at the opposite sides of the sealing rotor 12 placed in the center of the common housing 24. The intake ports 21 are shown separate but the exhaust ports are connected to a single outlet 25.

Separate exhaust outlets can be used, of course, when it is desired, for instance, to supply supercharged air separately to two sections of an engine. With a common exhaust, however, it is possible to obtain a much more uniform pressure than with a single compressing rotor (impeller). In a single acting compressor as shown in Fig. 1 there is a short interval when the flow of compressed air into the exhaust outlet is stopped (while the lug 15 is passing through the recess 16). With the double acting compressor the impellers are staggered, so that one unit continues to compress the air while the other unit is inactive. It is, of course, possible to combine three or more compressing rotors (impellers) with a single sealing rotor. It is also possible to arrange three or more units as a compound compressor.

The compressor shown in Fig. 3 has also pressure relieving devices, consisting of cylindrical housings 26 with rotary valves 27. The housings communicate with the chambers 28 through ports 29, and with the atmosphere through ports 30. By turning the valves 27 the ports may be more or less opened thereby relieving the compression in the chambers 28. This arrangement is useful when my compressor is used as a supercharger for airplane motors, in order to reduce the compression and the power consumption for the compressor when flying at low altitudes. These pressure relieving devices can be also placed on the intake ports for regulating the amount of air admitted to the compressor.

In order to reduce the shock when the compressed air passes into the recess 16, the wall of the housing is provided with a groove 31 which permits the air to pass gradually into the recess 16 when the latter approaches the chamber 11. A slot 32 is also provided in the rear horn of the recess 16 in order to avoid the shock at the moment of separation of the lug. The lugs 15 may be provided with slots for packing strips 33 made of leather or similar elastic material.

With my compressor it is possible to obtain a large volumetric displacement in a small housing, due to the arrangement of exhausting the compressed air through the body of the impeller and utilizing, therefore, practically all of the available space in the chamber 11. The special design of the recess 16 and of the lug 15 provides for a three point contact between the sides of the lug and of the recess, so that a very effective sealing against possible leakage is provided. The arrangement of the groove 17 has an advantage that the sudden drop in pressure when the lug 15 is passing from one side of the rotor 12 to the other, is reduced and can be even entirely eliminated by proper selection of the length of this groove. Due to the effective utilization of the space in the compression chamber my compressor develops a very high degree of compression.

My compressor can be operated at a high rate of speed with very little noise, due to the absence of reciprocating parts, and with very little wear, due to the absence of parts subjected to the pressure caused by centrifugal forces. For this reason it can be used in a large variety of industrial installations, in mines, for supplying air to furnaces and for ventilation, as a supercharger, as a vacuum pump, and also as a motor operated by compressed air or similar elastic fluid, by reversing the flow of the compressed air. In general, it can be used for any purpose for which a quiet, efficient rotary displacement pump or motor capable of developing high compression can be used.

Instead of connecting the exhaust ports of the twin compressor Fig. 3 to a single pipe 25, the exhaust of the first compressor may be connected to the intake of the second, thereby compounding the pressure. The first compressor will represent the first stage in the double acting compound unit, the second compressor being used for obtaining the final compression. It is desirable for this purpose to make the second or high pressure rotor of a smaller diameter on account of the decreased volume of the compressed air. With my device it is possible to make the rotors 17 of different diameters, making them also smaller or larger than the sealing rotor 12, the only condition being that they all should be geared so as to rotate at the same speed.

I claim as my invention:

1. In an air compressor, the combination with a housing, of a cylindrical impeller rotor in said housing, a cylindrical sealing rotor in said housing, said housing being provided with cylindrical chambers for said rotors, means to rotate said rotors, said rotors being adapted to touch each other with their cylindrical surfaces, a lug on said impeller rotor, said sealing rotor being provided with a recess for said lug, the tip of said lug being adapted to touch continuously the surface of said recess when said lug engages said recess, said housing being provided with an intake port at the point of convergence of said chambers where said lug leaves said recess, the inner surface of said chamber for the rotor with the lug being provided with a groove in the shape of an open circle concentric with the axis of said rotor and in communication with an exhaust port in said housing, said lug being convex on its rear side and provided with an aperture in its front side in communication with said groove, said aperture being diverging outward with curved sides so as to reduce the air friction, the rear wall of said lug being in the shape of a thin blade curved in the direction of movement of said rotor, the beginning of said circular groove being near said intake port, the end of said groove being at a point where the lug enters said recess in the sealing rotor.

2. In an air compressor, the combination with a housing, of a sealing rotor with a recess at one side, an impeller rotor at one side of said sealing rotor, a second impeller rotor at the other side of said sealing rotor, said rotors being of a cylindrical shape and adapted to touch each other with their cylindrical surfaces, gears connected with said rotors and in mesh with each other for turning said rotors, said impeller rotors being provided with lugs adapted to alternately engage said recess in the sealing rotor, said housing being provided with cylindrical chambers for said rotors, the end walls in said chambers for said impeller rotors being provided with circular grooves, said lugs having convex rear sides and provided with diverging outward openings in their front sides in communication with said grooves, the rear walls of said lugs forming curved blades for scooping the air, said grooves beginning near said intake ports and terminating near the points of entrance of said lugs into said recess, and rotary valves for controlling the air flow through said compressor.

SERGE G. KOTELEVTSEFF.